Aug. 18, 1931.       D. S. JACOBUS       1,819,244
TEMPERATURE REGULATING AND INDICATING DEVICE
Original Filed Nov. 10, 1924    5 Sheets-Sheet 1
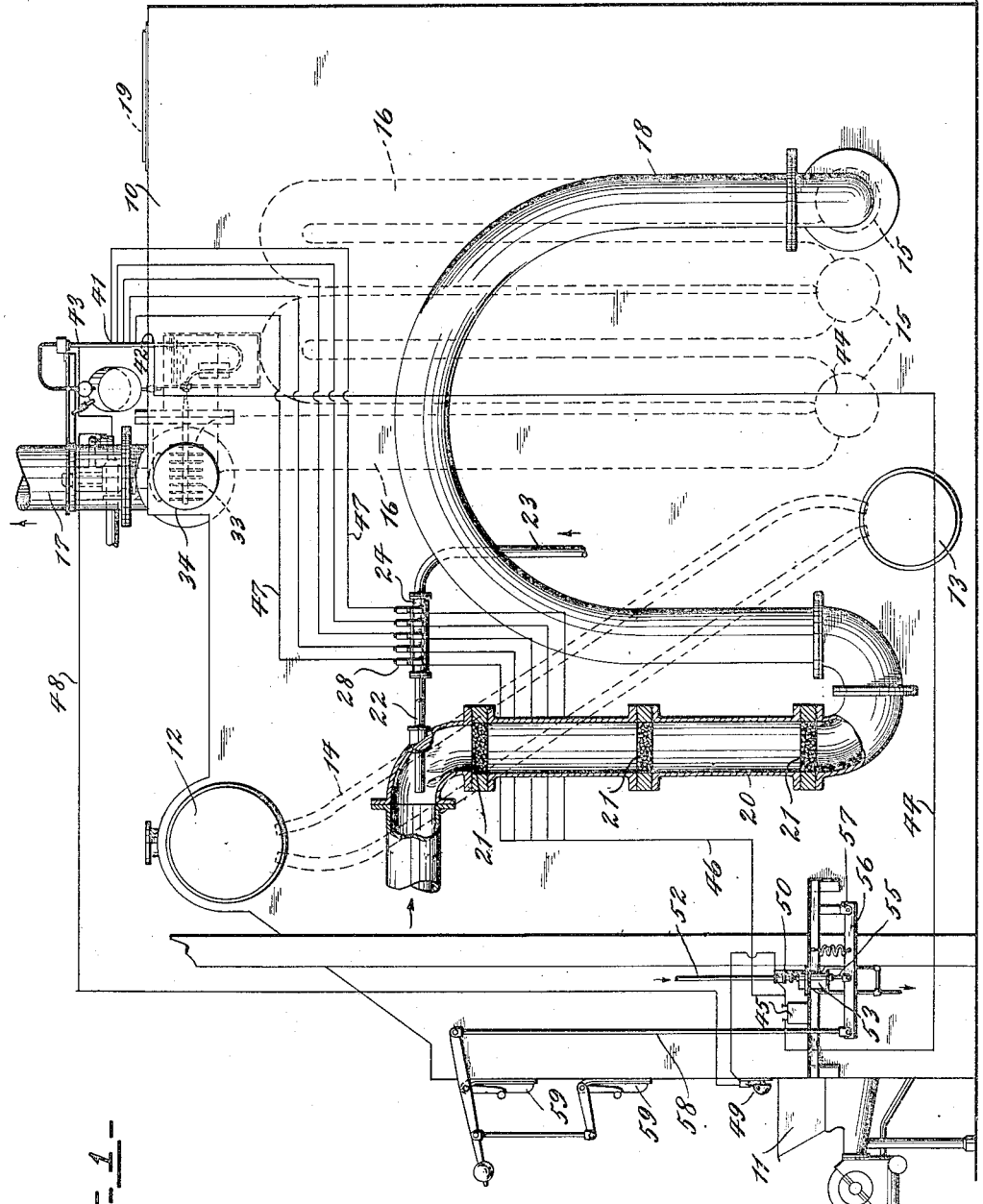
INVENTOR
David S. Jacobus
BY
Gifford & Scull
ATTORNEYS

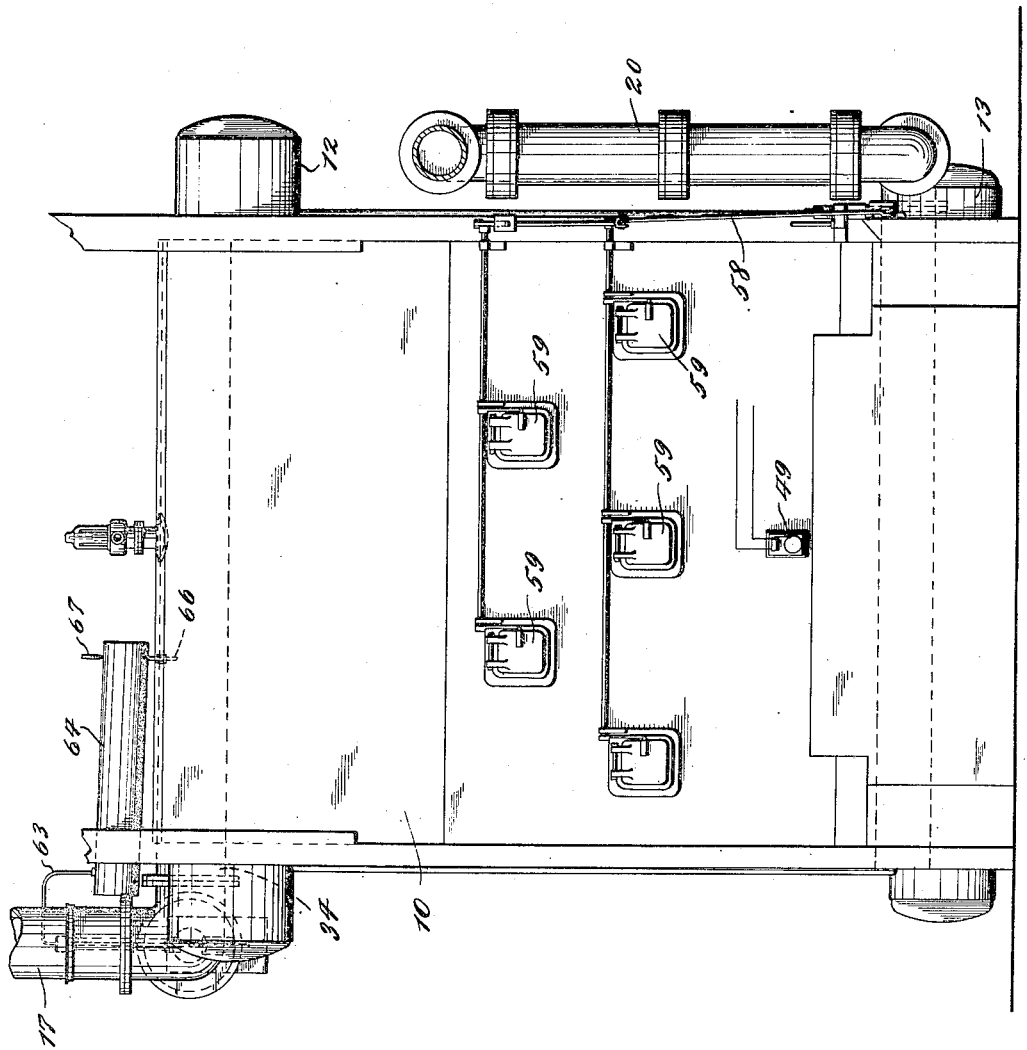

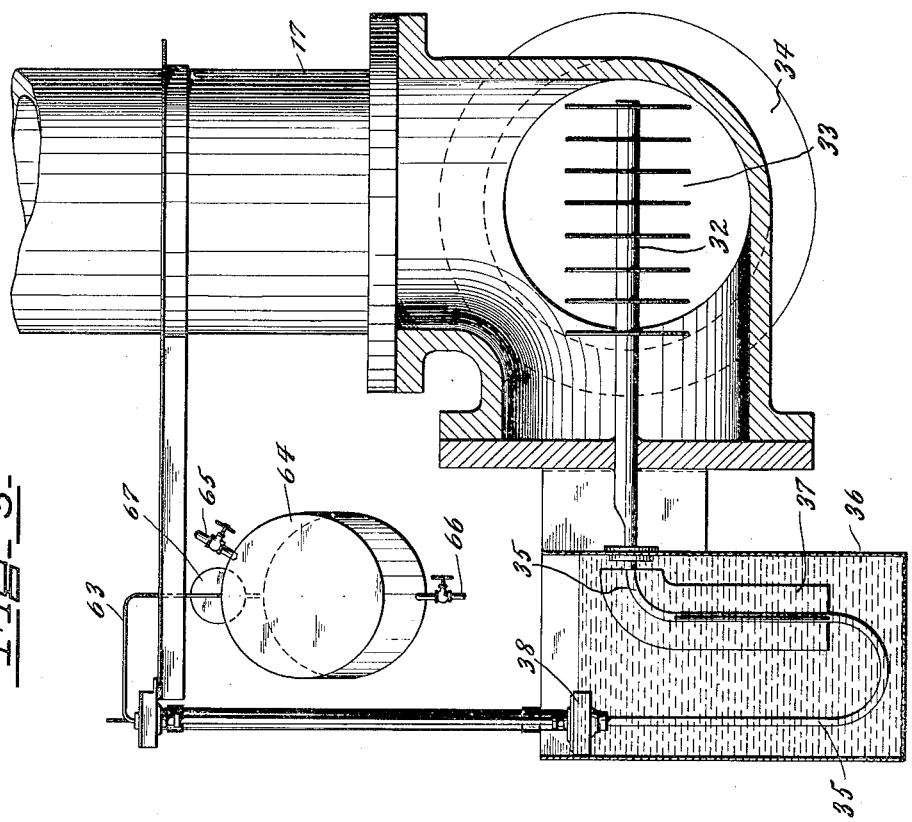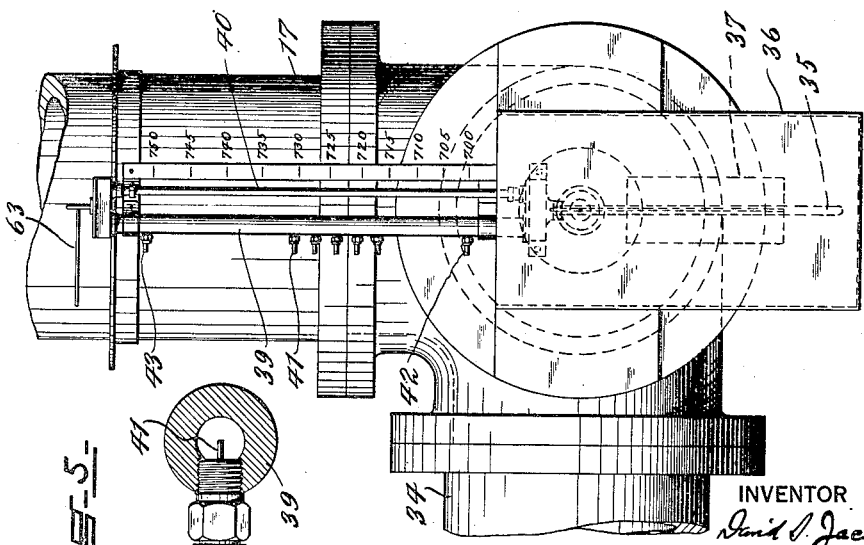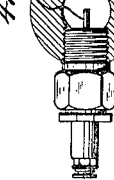

Aug. 18, 1931.   D. S. JACOBUS   1,819,244
TEMPERATURE REGULATING AND INDICATING DEVICE
Original Filed Nov. 10, 1924   5 Sheets-Sheet 4
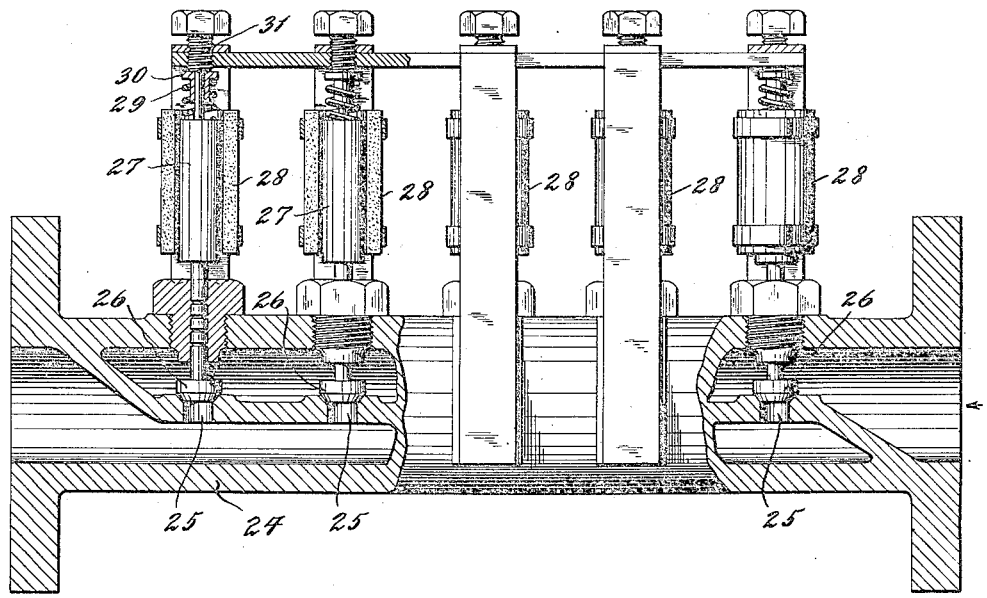
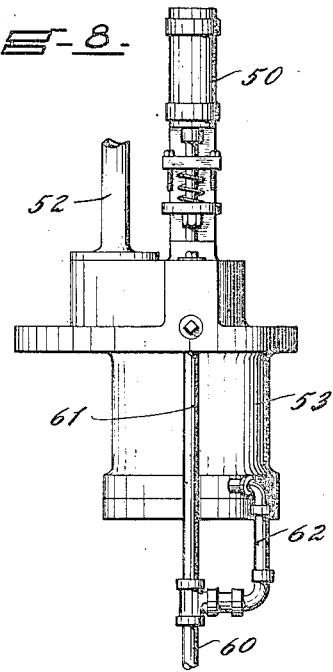
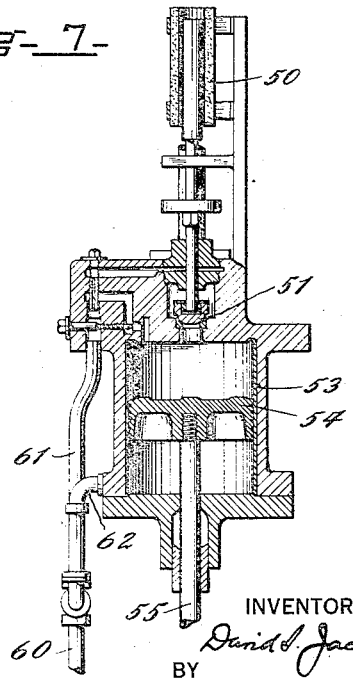
INVENTOR
David S. Jacobus
BY
Gifford & Scull
ATTORNEYS

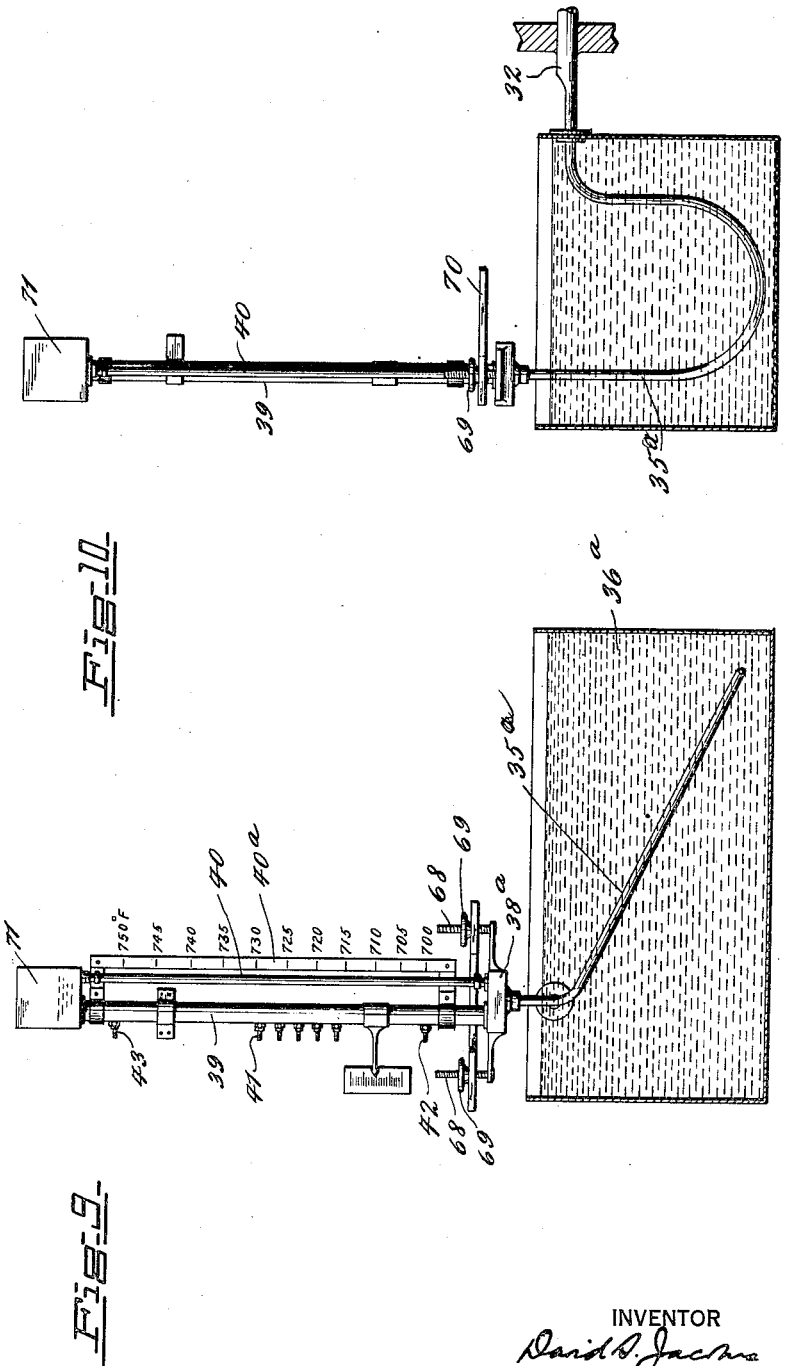

Patented Aug. 18, 1931

1,819,244

UNITED STATES PATENT OFFICE

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY

TEMPERATURE REGULATING AND INDICATING DEVICE

Application filed November 10, 1924, Serial No. 748,885. Renewed December 18, 1930.

My present invention relates to devices for regulating and indicating the temperature of superheated steam or the like, and will be best understood from the following description and the annexed drawings, in which Fig. 1 is a side elevation, with some of the parts broken away, of a separately fired superheater to which my invention is applied; Fig. 2 is a view from the left of Fig. 1; Fig. 3 is a side view, with some of the parts broken away, and Fig. 4 is an end view of a part of the apparatus shown in Fig. 1; Fig. 5 is a detail; Fig. 6 is an enlarged portion of a part of Fig. 1, with some of the parts broken away; Fig. 7 is a vertical section, and Fig. 8 is a side view of a portion of Fig. 1, and Figs. 9 and 10 are, respectively, side and end views showing a modification.

Like reference characters indicate like parts in the several views.

For purposes of illustration, I have shown my invention applied to a superheater. In the illustrative arrangement, a casing 10 has an underfeed stoker 11 and a steam generating unit therein comprising an upper drum 12 and a lower drum 13 connected by tubes 14 and a superheater which, in the form illustrated, has a plurality of lower drums 15 connected by banks of U-tubes 16, the last bank communicating with a steam outlet pipe 17. A steam inlet pipe 18 supplies steam to one of the drums 15 from any external source, such as another steam generator, the intermediate stages of a steam turbine, or the like. Steam entering by the inlet pipe 18 passes successively through the banks 16 and the drums 15 of the superheater to the outlet 17, being heated by the hot gases passing through the casing 10 after flowing over the tubes 14, such gases passing out at the gas outlet 19.

The arrangement which I have illustrated is particularly adapted for use in connection with the arrangements for regulating the superheat of steam disclosed in the copending application of Vern E. Alden, Serial No. 33,721 filed May 29, 1925. In such an arrangement, the temperature of the superheated steam passing out of the outlet pipe 17 is regulated and controlled by the admission of water into the inlet side of the superheater, the quantity of water introduced being determined by the temperature of the superheated steam, so that as such temperature rises, the quantity of water admitted to the inlet side will be increased, whereby the temperature of the superheated steam in the pipe 17 may be maintained substantially constant.

To the curved inlet pipe 18 is connected a vertically disposed section 20, having a plurality of screens 21 therein, and also having at its upper portion a water inlet pipe 22, the water from which will fall downward in the vertical section and be received by the screens 21 to be contacted by the inflowing steam and the pipe 22 being supplied through a water inlet pipe 23 controlled by a plurality of valves in a valve body 24. This valve body and its valves are best shown in Fig. 6. The quantity of water passing from the right to the left of the valve body 24 is determined by the number of ports 25 which have their valves 26 opened. In the arrangement described, each of the valves 26 is provided with a stem having a soft iron core 27 thereon, this core being positioned inside of a solenoid 28 and the valve being normally closed by a spring 29. When the solenoid 28 is energized, the core 27 will be drawn up to open the valve 26 and the amount of this opening will be determined by the contact between the top of core 27 and the bottom of a member 30 whose position can be regulated by a screw 31 attached to a fixed part of the valve body.

In the outlet pipe 17, as best shown in Figs. 3 and 4, I position a vessel 32, preferably in the form of a closed horizontal tube, such tube having fins 33 connected to it to permit a more ready transfer of heat from the steam flowing through the end of the upper drum 34 of the superheater into the outlet pipe 17. The end of the vessel 32 projects through the wall of an elbow and is connected to a U-tube 35 which is positioned in a tank 36 filled with water, the tube 35 also being provided with fins 37 to give a greater thermal contact between the tube 35 and the water in the tank 36. The left-hand end of the U-tube 35 is connected to a header 38 which may be conveniently fastened to the wall of the tank 36, this header having connected thereto a vertical tube 39 which preferably will be of metal, such as steel, and a glass tube 40, this latter being a level indicating tube.

The vessel 32, the U-tube 35 and the vertical tubes 39 and 40 contain mercury. The heat from the superheated steam flowing from the drum 34 will cause the mercury to boil and produce vapor pressure corresponding to the temperature, which pressure will be transmitted through the U-tube to the mercury columns in the tubes 39 and 40, whereby the heights of those columns will be varied in accordance with the temperature of the superheated steam. The volume of the vessel 32 is such that it remains partly full of liquid mercury when the mercury is at the maximum height in the tubes 39 and 40. The vessel 32 is preferably formed with the connection leading to the U-tube 35 arranged so that it will lead from the lower part of the vessel, thereby preventing mercury vapor from entering the U-tube 35. Such an arrangement can be obtained by flattening the end of vessel 32, as shown best in Fig. 3. Preferably, I provide the tank 36 with its water so that the temperature of the liquid mercury in the U-tube 35 will be substantially constant. The tank of cooling liquid and the fins 37 serve to maintain the temperature of the liquid in the U-tube below its vaporizing point, so that, even though vapor should develop in the vessel 32 to such an extent as to lower the level of liquid therein enough to permit vapor to pass into the U-tube, such vapor would be condensed before it could pass into the vertical tube 39. The pressure exerted by the vapor in the vessel 32 is thus transmitted to the liquid in the tube 39, the liquid being maintained in its liquid condition.

In the wall of the vertical column 39 are inserted a number of contact points 41 which may be conveniently arranged in a well-known form of spark plug, there being five of such contact points indicated in Fig. 4. In addition, there is a contact point indicated at 42 in Fig. 4 at the bottom of the tube 39 and a contact point indicated at 43 at the top of the tube 39.

Each of the contact points 41 is included in an electric circuit extending from the contact 42 through the wire 44 to the battery 45 and from thence to a trunk 46, to which is connected wires 47 leading to each of the contacts 41, each of the wires 47 also including a solenoid 28.

With the arrangement described, it will be obvious that, as the temperature of the steam rises as it passes into the outlet 17, the pressure in the vessel 32 will be increased and the column of mercury 39 raised until the lowermost of the contacts 41 will be reached by the top of the mercury column. This will establish a circuit through the mercury and between this contact 41 and the contact 42 and close the circuit through a solenoid 28 to energize that solenoid and open the corresponding valve 26 to admit a certain quantity of water to the vertical pipe 20 and the incoming steam.

If this does not lower the temperature of the steam sufficiently, the mercury column in the tube 39 will continue to rise and successively contact the points 41, and therefore successively open additional valves 26 to increase the supply of water.

If, for any reason, the admission of water through the pipe 22 does not keep the superheat within the desired range, then the column of mercury will ultimately contact with the point 43 and close a circuit through the wire 48, an alarm 49, solenoid 50, the battery 45 and the contact 42. The energizing of the solenoid 50 will open a valve 51, as shown best in Figs. 7 and 8, to admit water from the pipe 52 to a motor cylinder 53 having a piston 54 connected by the rod 55 to a lever 56, pivoted at 57 and connected through the links 58 with doors 59 in the setting by which cold air can be admitted to the superheater tubes 16. The motor cylinder 53 is connected with an outlet pipe 60 through the pipes 61 and 62, the latter carrying away any leakage past the piston 54 and the former carrying away any leakage around the valve stem and also water which flows through the cylinder 53 as soon as the valve 51 is opened through a constantly opened connection. This latter arrangement permits the water in the cylinder 53 to flow out through the pipes 61 as soon as the continued supply of water past the valve 51 is shut off after the danger period is past. If desired, the lever 56 can be connected to arrangements for shutting off the operation of the stoker at the same time that the doors 59 are opened.

The tube 39 may be opened to the atmosphere at the top, in which case, the level of the column would vary with the barometric pressure, so that this column of mercury would not respond accurately to the pressure in the receptacle 32. To obviate this difficulty, I may close the top of the tube 39 and connect this closed top through the tube 63 with a tank 64 in which a gas (preferably one which will not react with mercury) is maintained at a constant pressure, such gas being admitted and withdrawn through the pipe 65. The tank 64 may be provided with a drain pipe 66 and also a gauge 67. The pressure in the tank 64 and therefore on top of the column of mercury in the tube 39 may be either above or below atmospheric pressure, so long as it is maintained constant.

Instead of providing a constant pressure on top of the mercury column, I may arrange this column so that the contact points therein may be raised or lowered bodily in relation to the level of the mercury therein. Such an arrangement is shown in Figs. 9 and 10, in which the header 38ª is supported on threaded members 68 controlled by nuts 69 resting on a fixed member 70, so that by adjusting the nuts 69, the header 38ª and with it the columns 39 and 40 and all of the contacts may be raised or lowered in accordance with the barometric conditions so as to maintain a constant relation between the contact members in the tube 39 and the normal level of the mercury in that tube. In order to permit the header 38ª to be raised and lowered, the tube 35ª will be made of some suitable flexible metal, and preferably the tube will be bent in two planes, as indicated in Figs. 9 and 10, so as to reduce the amount of bending when the header 38ª is adjusted. In this arrangement, the tubes 39 and 40 may communicate with a receptacle 71. The receptacle 71 is used for charging the apparatus with the desired amount of mercury. To charge the apparatus, the mercury is placed in the receptacle 71. The vessel 32 is then heated, which expels the air and on cooling, some of the mercury is drawn into the vessel 32. The vessel 32 is then reheated and the mercury therein vaporized, which drives out air along with the mercury vapor, the mercury vapor being condensed in the tubes 35ª, 39 and 40 so that there is no loss of the mercury vapor. The vessel 32 is again allowed to cool and to draw in mercury. After several heatings and coolings, practically all of the air is driven out of the apparatus and it is ready for use.

Enough mercury is charged to completely fill the vessel 32 and to seal the U-tube when cold and the size of the vessel 32 is such that, when the mercury stands at the maximum height in the tubes 39 and 40 through the vaporization of the mercury in the vessel 32, there is still liquid mercury contained in the vessel 32.

The glass tube 40 is provided with a scale 40ª to indicate the temperature. In the arrangement shown in Figs. 9 and 10, where the tubes 39 and 40 are arranged so that they can be raised and lowered to compensate for variations in the barometer readings, the scale 40ª is carried by the tubes and is raised and lowered along with the tubes It will be understood that the normal height of the column of liquid in tube 39 will be varied in accordance with the liquid used, so that boiling in the vessel 32 will not take place (because of the pressure in it due to the height of the column in the tube 39) until the temperature of the steam in flowing around the vessel 32 reaches the point where it is desired to prevent any further increase in the steam temperature. Then, when boiling does take place, the increased pressure in vessel 32 will rapidly raise the level of the fluid in tube 39 to operate the electrical contacts, as before described. It will be understood, therefore, that, in the appended claims, the phrase "a liquid which boils at the temperature at which the device is operated" refers to the boiling of the liquid at the pressure existing in the vessel 32 and not to the boiling point of the fluid under atmospheric pressure.

It will be understood that the arrangement which I have described is merely illustrative and that my novel regulating device may be used in any form of superheating device, in which term I include a reheater for steam taken from between the stages of a steam turbine. It will also be understood that parts of my invention may be used independently of other parts.

I claim:

1. In a device of the class described, a closed vessel subjected to the heat of the medium whose temperature is to be regulated, a vertical tube out of contact with the medium and a U-tube connection between said tube and said vessel, said vessel, tube and connection containing a liquid which boils at the temperature at which the device is operated, whereby the height of the liquid column in said vertical tube is varied in accordance with the pressure in said vessel, means controlled by the height of said liquid column to change the temperature of said medium and means between the vessel and the vertical tube and adapted to condense the vapor formed in said vessel before it reaches said vertical tube.

2. In a device of the class described, a closed vessel subjected to the heat of the medium whose temperature is to be regulated, a vertical tube out of contact with the medium and connected to said vessel, said vessel, tube and connection containing a liquid which boils at the temperature at which the device is operated, whereby the height of the liquid column in said vertical tube is varied in accordance with the pressure in said vessel, a connection between said tube and said vessel smaller than the vessel and joined to the vessel at a point below the lowest level of the liquid in said vessel, means controlled by the height of said liquid column to change the temperature of said medium and means between the vessel and the vertical tube and adapted to condense the vapor formed in said vessel before it reaches said vertical tube.

3. In a device of the class described, a closed vessel subjected to the heat of the medium whose temperature is to be regulated, a vertical tube out of contact with the medium and a U-tube connection between said tube and said vessel, said vessel, tube and connection containing a liquid which boils at the temperature at which the device is operated, the top of the tube being above the level of the liquid in the vessel, whereby the height of the liquid column in said vertical tube is varied in accordance with the pressure in said vessel, means to maintain the temperature in said U-tube connection substantially constant, and means controlled by the height of said liquid column to change the temperature of said medium.

4. In a device of the class described, a closed vessel subjected to the heat of the medium whose temperature is to be regulated, a vertical tube out of contact with the medium and connected to said vessel, said vessel, tube and connection containing a liquid which boils at the temperature at which the device is operated, the top of said tube being above the level of the liquid in the vessel, whereby the height of the liquid column in said vertical tube is varied in accordance with the pressure in said vessel, means for maintaining a constant pressure above said liquid column, and means controlled by the height of said liquid column to change the temperature of said medium.

5. In a device of the class described, a closed vessel subjected to the heat of the medium whose temperature is to be regulated, a vertical tube out of contact with the medium and a U-tube connection between said tube and said vessel, said vessel, tube and connection containing a liquid which boils at the temperature at which the device is operated, the top of said tube being above the level of the liquid in the vessel, whereby the height of the liquid column in said vertical tube is varied in accordance with the pressure in said vessel, means for maintaining a constant pressure above said liquid column, and means controlled by the height of said liquid column to change the temperature of said medium.

6. In a device of the class described, a horizontally disposed tube closed at one end and open at the other and subjected to the heat of the medium whose temperature is to be regulated, fins on said tube to increase its heat absorbing surface, a vertical tube out of contact with the medium and connected to the open end of said horizontal tube, said horizontal tube, connection and vertical tube containing a liquid which boils at the temperature at which the device operates, whereby the height of the liquid column in said vertical tube is varied in accordance with the pressure in said horizontal tube, and means controlled by the height of said liquid column to change the temperature of said medium.

7. In a device of the class described, a vertical tube, a vessel subjected to the heat of the medium whose temperature is to be regulated, a connection between said vessel and said tube, said tube, connection and vessel being filled with a vaporizable fluid, means controlled by the height of fluid in said vertical tube to change the temperature of said medium, and a tank containing a cooling liquid and adapted to receive said connection, whereby the fluid passing from the vessel to the tube is cooled.

8. In a device of the class described, a vertical tube, a vessel subjected to the heat of the medium whose temperature is to be regulated, a connection between said vessel and said tube, said tube, connection and vessel being filled with a vaporizable fluid, and means to maintain the temperature of the liquid in said tube below that of the liquid in said vessel, the connection entering said vessel at a point below the lowest level of the fluid in said vessel.

9. In a device of the class described, a horizontally disposed tube closed at one end and open at the other and subjected to the heat of the medium whose temperature is to be regulated, a vertical tube out of contact with the medium and connected to the open end of said horizontal tube, said horizontal tube, connection and vertical tube containing a liquid which boils at the temperature at which the device operates, whereby the height of the liquid column in said vertical tube is varied in accordance with the pressure in said horizontal tube, a plurality of electrical contacts in said tube, a plurality of means to change the temperature of said medium, and a plurality of electric circuits, each including one of said contacts and one of said means, whereby said means are operated successively as the height of the liquid column in said vertical tube is increased.

10. In a device of the class described, a horizontally disposed tube closed at one end and open at the other and subjected to the heat of the medium whose temperature is to be regulated, a vertical tube out of contact with the medium and connected to the open end of said horizontal tube, said horizontal tube, connection and vertical tube containing a liquid which boils at the temperature at which the device operates, whereby the height of the liquid column in said vertical tube is varied in accordance with the pressure in said horizontal tube, a plurality of electrical contacts in said tube, a plurality of means to change the temperature of said medium and a plurality of electric circuits, each including one of said contacts and one of said means, whereby said means are operated successively as the height of the liquid column in said vertical tube is increased, and means to cause the top of the mercury column to contact with each of said contacts at predetermined pressures in said horizontal tube, irrespective of the barometric pressure.

11. In a device of the class described, a closed vessel subjected to the heat of the medium whose temperature is to be regulated, a vertical tube out of contact with the medium and connected to said vessel, said vessel, tube and connection containing a liquid which boils at the temperature at which the device is operated, whereby the height of the liquid column in said vertical tube is varied in accordance with the pressure in said vessel, the connection between said tube and said vessel being at a point below the lowest level of the liquid in said vessel, means controlled by the height of said liquid column to change the temperature of said medium, and means to indicate the liquid level in said tube.

12. In a device of the class described, a closed vessel subjected to the heat of the medium whose temperature is to be regulated, a vertical tube out of contact with the medium and connected to said vessel, said vessel, tube and connection containing a liquid which boils at the temperature at which the device is operated, whereby the height of the liquid column in said vertical tube is varied in accordance with the pressure in said vessel, the connection between said tube and said vessel being at a point below the lowest level of the liquid in said vessel, and means to indicate the liquid level in said tube.

13. In a device of the class described, a closed vessel containing a fluid and subjected to the heat of a medium whose temperature is to be regulated and a plurality of means to change the temperature of said medium, said means being operated in succession by changes in the temperature of said vessel.

14. In a device of the class described, a closed vessel containing a fluid and subjected to the heat of a medium whose temperature is to be regulated, a tube connected to said vessel, means to condense vapor formed in said vessel before it reaches said tube, whereby the fluid in said tube is maintained in a liquid condition, a plurality of means each adapted to change the temperature of said medium, and a plurality of devices operated in succession by movement of said liquid in said tube under pressure of the vapor in said vessel, each of said devices being adapted to operate one of said temperature changing means.

15. In a device of the class described, a closed vessel subjected to the heat of the medium whose temperature is to be regulated, a tube connected to said vessel and out of contact with said medium, a fluid in said vessel and tube and adapted to be moved by variations in the heat of said medium, a plurality of electric circuits, each of which is normally open at a point in said tube, means to close said circuits in succession at said points by movement of the fluid in said tube, and means operated by the successive closing of said circuits to progressively change the temperature of said medium.

16. In a device of the class described, a vessel subjected to the heat of the medium whose temperature is to be regulated, a tube connected to said vessel and out of contact with said medium, a liquid in said vessel and tube and adapted to be vaporized in said vessel by the heat of said medium, a connection between said vessel and tube smaller than the vessel and joined to the vessel at a point below the lowest level of the liquid in said vessel, means operated by movement of the liquid in said tube to change the temperature of said medium, and means between the vessel and the vertical tube and adapted to condense the vapor formed in said vessel before it reaches said vertical tube.

17. In a device of the class described, a closed vessel containing a fluid and subjected to the heat of a medium whose temperature is to be regulated, a tube connected to said vessel and containing a fluid responsive to the pressure in said vessel, means to condense vapor formed in said vessel before it reaches said tube, a plurality of means each adapted to change the temperature of said medium, and a plurality of devices operated in succession by movement of said liquid in said tube under pressure of the vapor in said vessel, each of said devices being adapted to operate one of said temperature changing means.

18. In a device of the class described, a closed vessel containing a fluid and subjected to the heat of a medium whose temperature is to be regulated, a tube connected to said vessel and containing a fluid responsive to the pressure in said vessel, means to condense vapors formed in said vessel before it reaches said tube, means adapted to change the temperature of said medium, and a device operated by movement of said liquid in said tube under pressure of the vapor in said vessel, said device being adapted to operate said temperature changing means.

DAVID S. JACOBUS.